United States Patent

[11] 3,558,845

| [72] | Inventor | James E. Norcross<br>Media, Pa. |
|---|---|---|
| [21] | Appl. No. | 810,498 |
| [22] | Filed | Mar. 26, 1969 |
| [45] | Patented | Jan. 26, 1971 |
| [73] | Assignee | Arcos Corporation<br>Philadelphia, Pa.<br>a corporation of Pennsylvania |

[54] ELECTROSLAG WELDING NOZZLE AND PROCESS
10 Claims, 18 Drawing Figs.

| [52] | U.S. Cl. | 219/73 |
|---|---|---|
| [51] | Int. Cl. | B23k 9/18,<br>B23k 25/00 |
| [50] | Field of Search | 219/73,<br>126, 136, 145 |

[56] References Cited
UNITED STATES PATENTS

| 2,300,670 | 11/1942 | Hopkins | 219/73 |
|---|---|---|---|
| 2,948,805 | 8/1960 | Berg et al. | 219/146 |
| 3,192,356 | 6/1965 | Shrubsall | 219/73 |
| 3,291,955 | 12/1966 | Shrubsall et al. | 219/73 |
| 3,325,619 | 6/1967 | Tanenbaum | 219/73 |

*Primary Examiner*—Joseph V. Truhe
*Assistant Examiner*—Lawrence A. Rouse
*Attorney*—Jackson, Jackson and Chovanes ABSTRACT: An electroslag welding nozzle having a guide opening toward the middle and wing bars extending out at different sides, the nozzle being enrobed with an adhering coating of electroslag welding flux. In the electroslag welding process the nozzle is stationary and greatly increases the thickness of permissible vertical welds which can be made with a single electrode without horizontal oscillation.

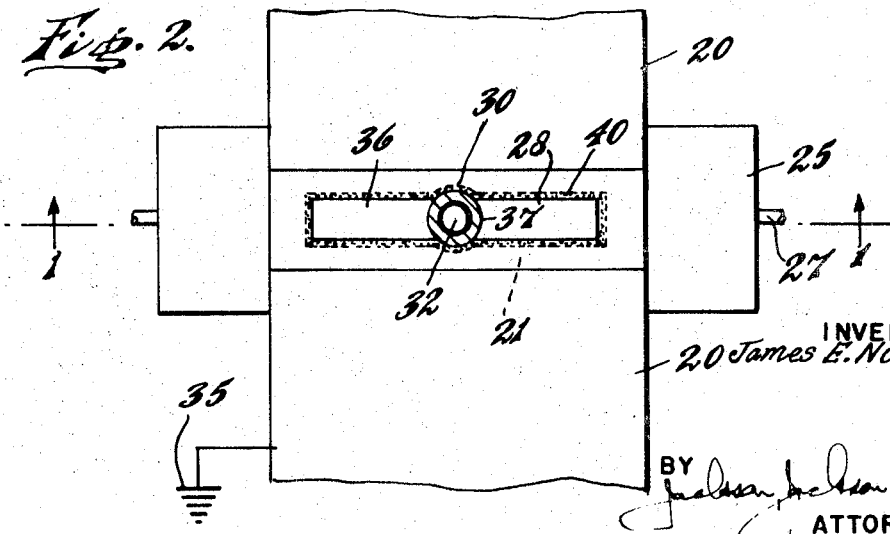

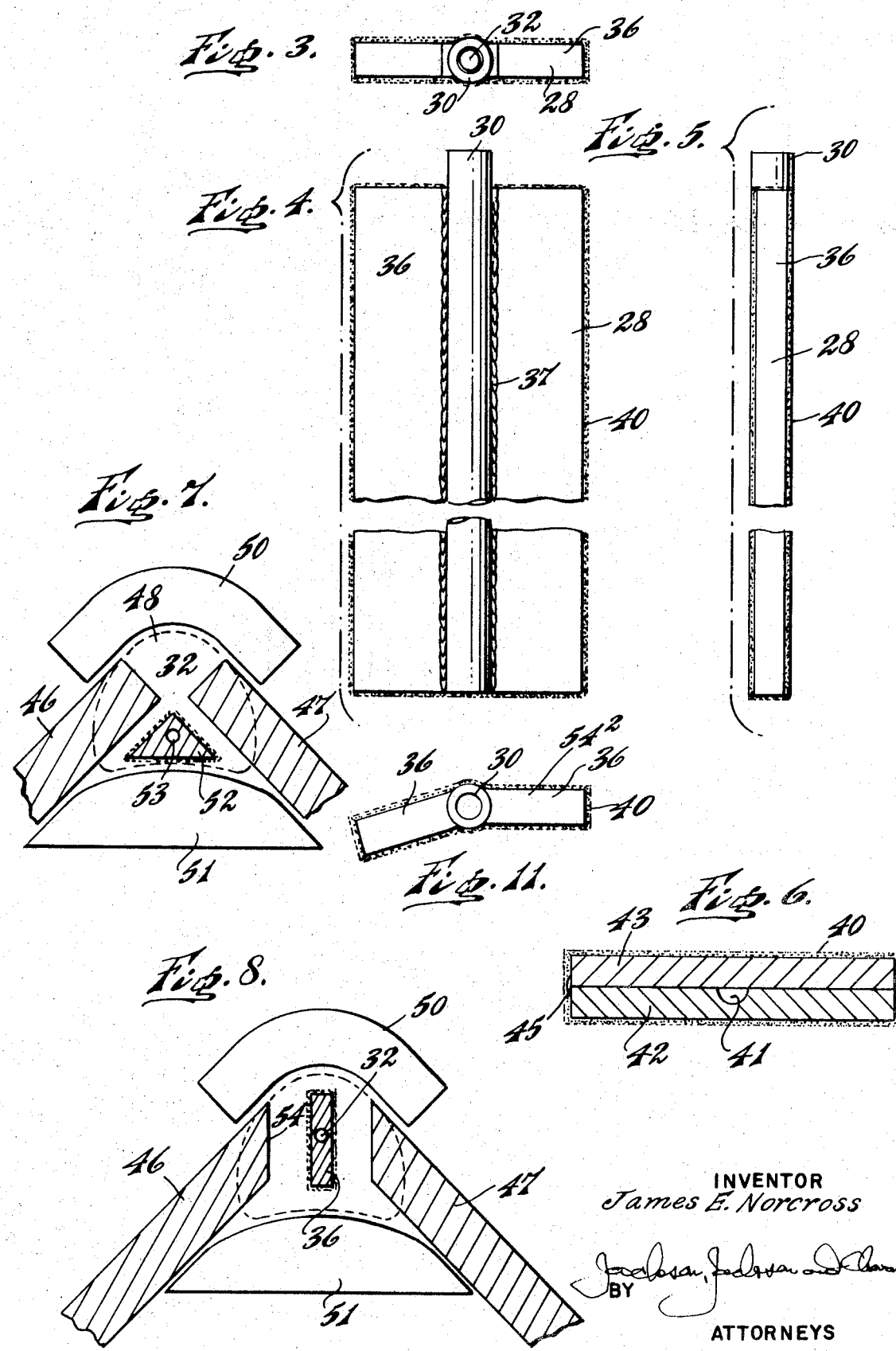

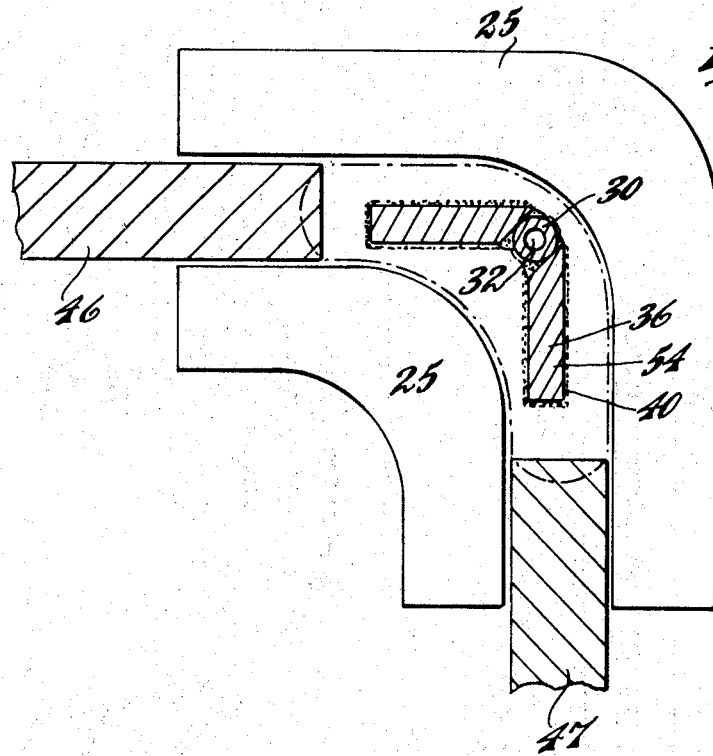
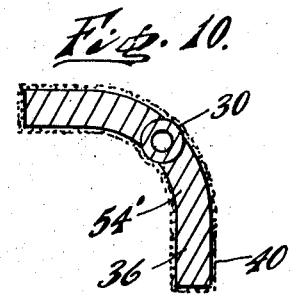
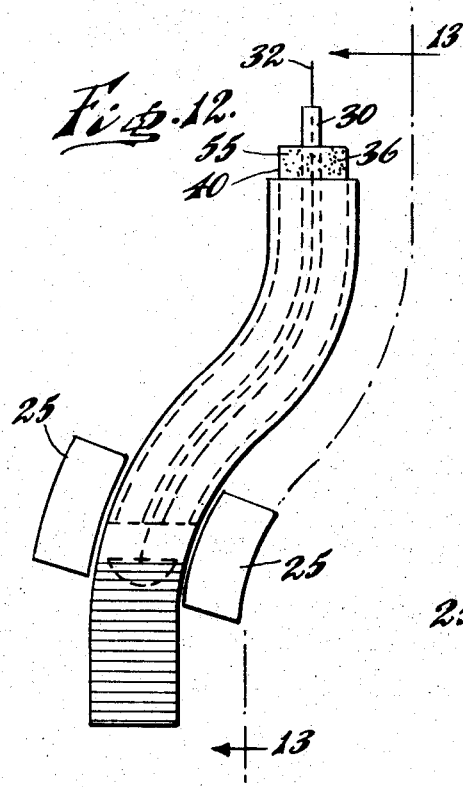
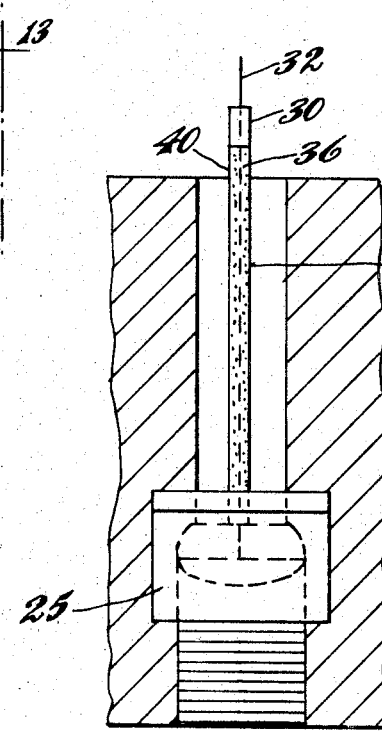
INVENTOR
James E. Norcross
ATTORNEYS

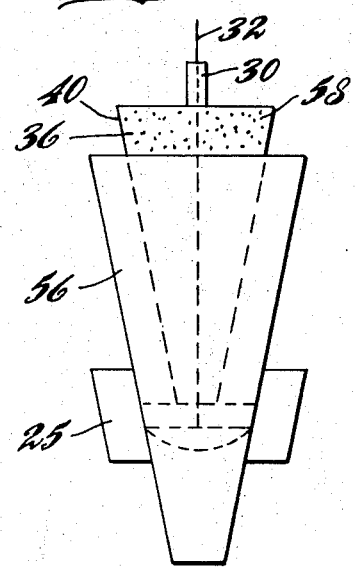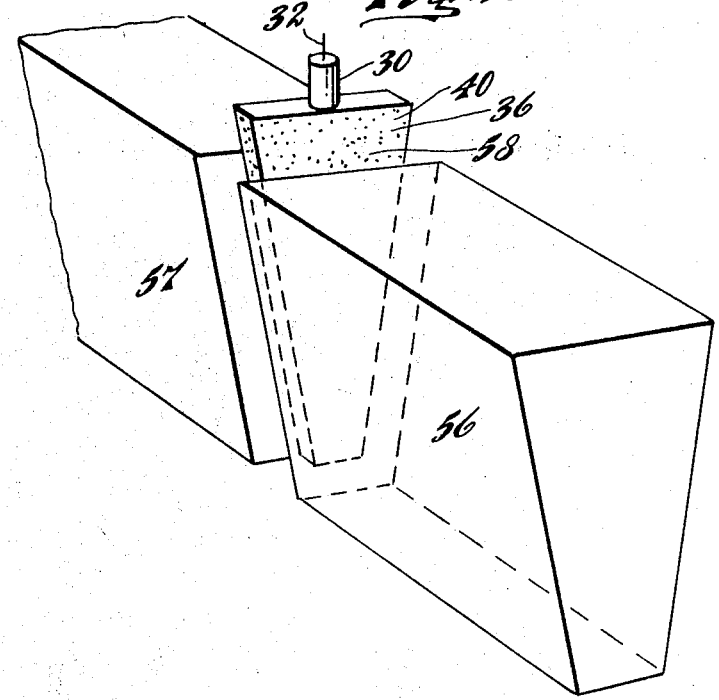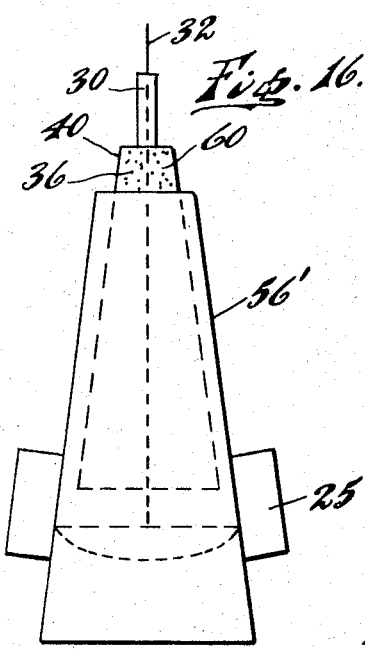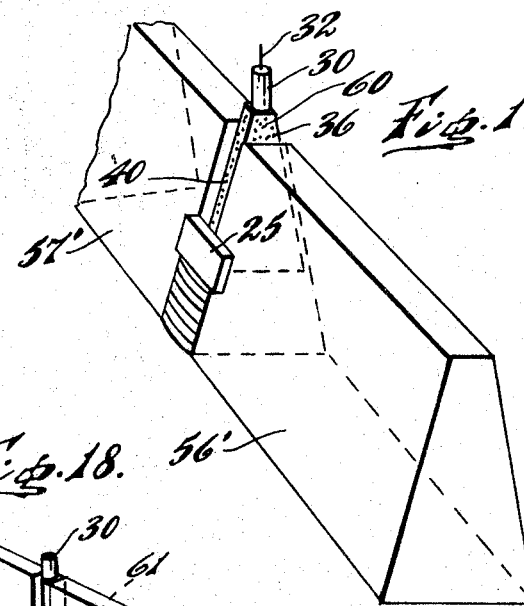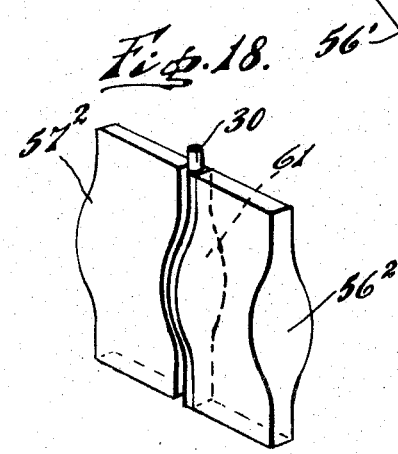

ELECTROSLAG WELDING NOZZLE AND PROCESS

DISCLOSURE OF INVENTION

The invention relates to electroslag welding of generally vertical joints.

A purpose of the invention is to locate in the weld groove between generally vertical plates an upwardly extending stationary consumable metallic nozzle having a metallic guide opening toward the middle, preferably from a guide tube, through which a single electrode is introduced, having wing bars extending out on two sides of the guide opening, and having an adhering coating of electroslag flux enrobing the nozzle and melting off as the weld rises and as the nozzle itself melts off.

A further purpose is to promote the welding of thicker plates in generally vertical joints by electroslag welding using a single electrode, without oscillating the electrode horizontally, permissibly welding plates of a thickness of 128 mm. or more.

A further purpose is to use a flux composition on the nozzle having 2 to 10 percent by weight of calcium fluoride, 34 to 42 percent of silica, 2 to 40 percent of manganese oxide (MnO) and 6 to permissible range for an electroslag welding flux.

A further purpose is to make the wing bars extend from the single guide tube in a nonstraight relation, such as an angular, triangular or curved relation in horizontal section so as to more effectively conform to the contour of the particular weld.

A further purpose is to provide a nozzle which progressively changes in cross section or tapers from end to end.

A further purpose is to curve the nozzle from end to end to conform to curvature in plates.

Further purposes appear in the specification and in the claims.

There has been general recognition of the need to contribute metal to a weld between vertical plates from a source other than the electrode. Shrubsall U.S. Pat. No. 2,868,951, Guide Tube, employs a nozzle or guide tube in the welding groove in submerged arc welding. The nozzle has a flux coating on its exterior surface which insulates it from the plates and contributes to the slag. In B. E. Patton, Electroslag Welding (American Welding Society 1968) 135—141, there is an extensive discussion of electroslag welding using a consumable nozzle and various designs are shown at pages 136 and 139, including a form at page 139 that has a center guide tube, wing bars on opposite sides and guide tubes at both edges, with glass plates interposed between the nozzle and the metal plates being welded at the sides and ends of the nozzle cross section. Patton develops precise information and a formula for determining the permissible plate thickness which can be welded with a given number of electrodes. Solving the formula for one electrode, it is found that according to Patton's information, the maximum thickness is 40 mm.

One of the problems which has arisen in electroslag welding is control of the slag composition. It has been necessary in the past to add additions periodically, for example, by introducing powdered flux according to some predetermined schedule. The presence of the glass insulators on the Patton nozzle complicates this problem, because in the first place the composition of the glass is not suitable for an electroslag melting slag from the standpoint of viscosity and resistivity, so that as glass melts and enters the slag the composition has to be corrected at a rate which is difficult to determine, and also there has been a tendency for incompletely melted glass particles to form inclusions in the weld.

The present inventor has discovered that by modifying the construction of the nozzle, certain of these problems can be partially or wholly overcome. An improved consumable metallic nozzle has been produced according to the present invention using only a single guide passage or tube toward the middle, and wing bars adhering to the guide tube on its sides, and enrobing the outer surface of the entire nozzle cross section in an adhering coating of electroslag flux. The glass insulators used by Patton have been eliminated.

One of the great advantages of the present invention is that by keeping the nozzle stationary and avoiding the need for all oscillation in a horizontal direction, the nozzle of the present invention makes it possible to vertically weld much thicker plates than the 40 mm. limit determined by Patton. For example, using the present invention, plates of a thickness of 128 mm. have been welded very successfully, and there is every evidence that considerably thicker plates can be welded in this way.

Elimination of the glass insulators has done away with the possibility of forming inclusions from incompletely melted glass particles.

In the present invention the nozzle including its guide tube toward the middle and wings extending outwardly extends vertically upward through a generally vertical weld space. This weld space may be the groove between the ends of abutting plates in a vertical electroslag weld, the opening at the sides being closed by shoes or plates, or it may be the groove or space in a joint that departs somewhat from the vertical, although it has a substantial vertical component. For example, this technique has been used successfully in joints that are disposed as much as 45° to the vertical.

It has been found in experiments leading up to the present invention that with a single center guide passage or tube through which an electrode passes, the nozzle behaves unexpectedly. The nozzle is fixed in the weld groove both vertically and laterally, there being no oscillation in a horizontal plane. Initially penetrating into the molten slag which is on the top of the weld pool in an electroslag weld, the consumable metallic nozzle quickly becomes melted off until it is only slightly below the top of the molten slag, for example, of the order of one-fourth inch. The bare wire or strip electrode is, of course, entering the pool relatively rapidly through the metallic guide tube. As the weld pool builds up and solidifies and the weld rises, more and more of the consumable guide tube melts off, in a typical case according to the present invention the guide tube covering for example 39 percent of the horizontal cross section of the weld pool and contributing 39 percent of the metal to the weld.

Of course, since the electrode is being forced relatively deep into the slag pool, a substantial amount of the current for resistance heating passed through the electrode to the slag, but voltage measurements establish that a substantial amount of the electroslag welding current also passes to the molten slag through the guide tube and especially through the meltable wing bars which are welded to the side of the metallic guide tube and are, of course, in electrical contact with it. Thus, there is much more uniformity of heating in an electroslag weld according to the present invention than would be possible otherwise from a single electrode, especially one which was not oscillated in a horizontal plane. This decrease in current density at the interface between the consumable metal parts and the slag assures removal of hot spots in the slag and in the weld pool, more gradual and uniform melting, and less possibility that gobs of metal can be transferred to the weld in an incompletely melted form.

One explanation which appears to be correct based on experiment, is that when welding with a constant potential source, a steady state current flows when only the electrode is in contact with the molten slag, and this is rather low. Whenever the wing bars make contact with the molten slag, as they do at short intervals, high current surges momentarily flow through the molten slag adjacent the wing bars, and these surges melt off the nozzle and the adjoining edges of the plates in a deep penetrating pattern. This accounts for the heating of the slag remote from the electrode.

Since a thick layer of flux coating is adhering around the outer surface of the cross section of the nozzle to the plates, which might otherwise cause lateral arcing, no longer exists. By regulating the composition of the flux coating on the nozzle to conform to the desired composition of the slag, it will be evident that it is no longer necessary to compensate for unbalance of the slag composition, as in the case of melting of glass insulators.

Furthermore, since the top of the slag layer rises as the weld rises and the flux coating melts off progressively as the top of the slag layer rises, the coating can be made adequately thick to supply all the added flux which is needed, doing away with the necessity for adding flux in powder form, and merely requiring periodic removal of flux when it reaches an excessive depth.

The height of the nozzle can be adjusted to any convenient length and when the nozzle has melted off leaving only a stub which is used to make electric contact with it, for example, an extension of the guide tube which engages a contact clamp, it is merely necessary to remove this stub and substitute a new nozzle, raising the contact clamp to an appropriate new stationary position.

Of course, it will be evident that since the nozzle may provide a substantial portion of the weld metal, its analysis should to advantage approximate the desired analysis of the weld, or at least be considered in computing the weld composition. It will be recognized, of course, that, if desired, alloying ingredients can be imparted by the electrode, or the flux may include alloying ingredients which are to become part of the weld, or if desired metallic powders can be introduced to correct the weld composition to a desired alloy content.

It should also be evident, of course, that, if desired, metallurgical modifying ingredients such as deoxidizers can be incorporated either as part of the flux, part of the composition of the nozzle, part of the electrode or as an additional powdered ingredient incorporated in the slag by suitable powder feeding feeding.

FIG. 1 is a diagrammatic vertical section of an electroslag welding process using the nozzle of the invention, the section being taken on the line 1—1 of FIG. 2.

FIG. 2 is a horizontal section taken on the line 2—2 of FIG. 1.

FIG. 3 is an upper end elevation of the consumable nozzle of the invention, showing an electrode in its tube.

FIG. 4 is a side elevation of the nozzle shown in FIG. 3, omitting a portion of the flux coating.

FIG. 5 is an edge elevation of the nozzle shown in FIGS. 3 and 4, omitting the flux coating on the edge.

FIG. 6 is a horizontal cross section of a variant form of nozzle of the invention, in which a guide passage is made in a middle groove in at least one of two plates secured face to face.

FIG. 7 is a horizontal section of a corner joint of the invention, using a nozzle of triangular cross section.

FIG. 8 is a view similar to FIG. 7, showing a corner joint using a nozzle according to FIGS. 1 to 5 inclusive.

FIG. 9 is a plan section of a corner joint of the invention, using a nozzle having the wing bars disposed at right angles to the tube.

FIG. 10 is a plan section of a variant form of nozzle, similar to that in FIG. 9 but having the wing bars curved.

FIG. 11 is a view similar to FIG. 10 in which the wing bars are disposed to one another at an angle slightly less than 180°.

FIG. 12 is an end view in line with the plates showing an electroslag welding using a nozzle which has an axis which is curved from end to end.

FIG. 13 is a generally vertical section on the line 13—13 of FIG. 12.

FIG. 14 is an end view in line with the plates showing welding of a vertically tapered joint in plates using a vertically tapered nozzle according to the invention.

FIG. 15 is a perspective of the mechanism shown in FIG. 14 omitting the copper shoes.

FIG. 16 is an end view in line with the plates showing welding of inverted tapered plates using an inverted tapered nozzle according to the invention.

FIG. 17 is a perspective of the joint of FIG. 16.

FIG. 18 is a perspective showing a modified shape of plates and nozzle.

Spaced vertical plates 20 are joined by a progressively upwardly extending weld 21, the plates being of considerable thickness as described above. Above the weld 21 there is a weld space 22 in which resting on the weld there is a molten metallic weld pool 23 on top of which rests a layer of molten slag 24, for electric heating and melting of the metal according to the electroslag welding process. The weld pool and the molten slag pool are prevented from running out of the weld space at the sides by a shoe 25, suitably of copper, provided with water cooling passages 26 supplied with cooling medium through piping 27, as well known. The shoes will preferably move upward with the weld, although they may when desired be fixed and extending for the full height of the weld.

Held vertically and laterally stationary in the weld space is a consumable nozzle 28 having a metallic composition which is to contribute to the weld and has a composition not inconsistent with the weld. The nozzle includes a metallic tube or a pipe 30 which has an interior bore 31 slightly larger than that of a bar, strip or wire electrode 32 progressed downwardly through the tube 30 and in electrical contact with it throughout the length of the nozzle. The electrode 32 is progressed by any electrode feed mechanism 33 as well known.

The bare outer surface of the tube at the top is gripped by an electrical contact clamp 34 suitably of copper, which introduces welding current to the nozzle and through the nozzle to the electrode, it being evident that either the plates 20 or the previously made weld are grounded at 35.

Below the contact clamp 34 the guide tube 30 is in electric contact and supporting relation through its length with wing bars 36 secured to the sides of the guide tube by longitudinally extending welds 37.

The entire exposed outer surface of the guide tube, the wing bars and the connecting welds, except for the upward extension of the guide tube which is gripped by the contact clamp 34, is enrobed by an adhering coating 40 of finely divided electroslag flux particles in a binder such as sodium silicate which completely electrically insulates the metallic parts of the nozzle from the plates 20 and the shoes 25. Instead where desired the upper portion of the wing bars themselves may be free from flux and the clamp may make contact with the wing bars at this point.

Thus, assuming for the purpose of explanation that the electroslag welding process has started, and that there is a previously formed weld, a molten metallic weld pool 23 rests on the weld and on it rests a molten slag layer 24. The nozzle is in contact with the molten slag layer at or slightly below its upper surface and the electrode is penetrating somewhat into the molten slag layer. Current introduced by the contact clamp 34 enters the guide tube and through it enters the electrode, maintaining a heating current in the slag to cause $RI^2$ heating thereof. Other electric current enters the molten slag through the guide tube and still other current enters the molten slag through the wing bars.

As metal solidifies in the weld and the shoes 25 are usually moved upwardly and as more molten metal enters the weld pool, the upper surface of the molten slag layer rises, causing melting of the portion of the nozzle, including the guide tube and the wing bars, which is thus submerged more deeply beneath the molten slag, thus adding to the weld pool. Thus it will be evident that metal for the weld is a mixture of metal from the electrode, metal from the consumable nozzle, and metal from melting the edges of the plates 20, plus any metal derived from metallic powders in the flux or added separately. As the top of the molten slag layer rises, this causes melting of the lower portion of the flux coating on the nozzle, and thus controllably regulates addition of electroslag flux to the nozzle slag pool, avoiding or reducing the necessity for making powder additions separately to the slag. It will be evident, of course, that usual procedures will be employed to eliminate any excess of slag, as for example, by tapping it of off from a slag notch (not shown) in one of the copper shoes 25.

In some cases, as shown in FIG. 6, the bars themselves can be used to form a guide passageway 41 as shown in FIG. 6. In this case the nozzle is formed by a plate 42 and a plate 43, each relatively wide compared to their thickness in cross section, and having common wide meeting faces 44. The guide passage 41 is formed at the horizontal middle of the nozzle by machining a groove in at least one of the bars 42 and 43.

The bars are secured together at their ends as by welds 45 and the entire exterior surface is enrobed in flux 40 except for the upper end (not shown), which is left free from flux so as to engage a contact clamp of suitable shape and suitably insulated from the adjoining plates to be welded.

FIG. 7 shows a special corner construction between corner plates 46 and 47 which meet to provide a corner weld area 48 encaged by a bridging copper shoe 50 at the outside and by an interior copper shoe 51 at the inside. In this case a nozzle 52 of triangular cross section has a guide passageway or guide tube 53 for the electrode. FIG. 7 suggest that a special nozzle cross section can be made to occupy a special weld space.

In FIG. 8 it is shown that a standard nozzle can be used by chamfering the ends of plates 46 and 47 at relatively sharp angles as shown at 54.

In FIGS. 9 and 10 a modified corner construction is shown using a nozzle 54 which has the wing bars disposed at an angle of 90° to one another and secured by welds to the sides of the guide tube (FIG. 9), or as shown at 54' in FIG. 10, the wing bars curve to effectively provide a right angle shape.

In FIG. 11 a nozzle $54^2$ is shown in which the wing bars are disposed at an angle to one another that is less than 180° but more than a right angle for fitting in a special joint configuration.

As shown in FIGS. 12 and 13, the nozzle is placed in fixed position in a joint space which is curved and inclined, although the weld is always a vertical weld. This is accomplished conveniently by using a nozzle 55 whose axis curves from end to end, employing a curving guide tube and curving wing bars welded at the edges to the guide tube as shown.

In some cases, as shown in FIGS. 14 to 17, plates 56 and 57 taper, their thickness increasing upwardly (FIGS. 14 and 15) or plates 56' and 57' taper, their cross sections decreasing upwardly. Tapered nozzles 58 (FIGS. 14 and 15) or 60 (FIGS. 16 and 17) consist of tapering wing bars welded to the sides of a straight tube as shown, although the form of FIG. 6 can be employed also.

In FIG. 18, plates $56^2$ and $57^2$ are electroslag welded using a nozzle 61 having a tube and wing bars, the plates and nozzle being thick in the middle and thin at the top and bottom to make blades for a hydraulic turbine of a suitable alloy such as steel. The weld pool retaining blocks are omitted.

EXAMPLE 1

A vertical joint was welded between vertical plates of steel of approximately AISI 1020 analysis each of which was 3 inches thick, the space between the plates at the joint being approximately 1 ½ inches. Copper shoes at each side bridged this space an and moved upward as the weld progressed. A consumable metallic nozzle of AISI 1020 steel 24 inches long was positioned vertically in the weld groove between the plates. This consisted of a guide tube having one-half inch outside diameter am and five-thirty seconds inch inside diameter, which had wing plates on opposed sides along their narrow edges. The cross section of the wing plates was one-fourth inch by three-fourth inch and they were slightly shorter than the guide tube so as to allow room for engaging the guide tube at the top by the clamp 34 which made electrical contact.

The entire sidewall of the nozzle was coated with a layer of flux composition which had a total thickness of approximately one-sixteenth inch. The composition of the flux was as follows in percentage by weight:

Calcium flouride  6 percent
Silica  35 percent
Manganous oxide  40 percent
Alumina  5 percent
Lime  7 percent
Titania  3 percent
Ferrous oxide  3 percent
Sodium oxide  1 percent The particles of flux were finely divided, being below 100 mesh per linear inch.

A slurry was made up with 100 parts by weight of dry flux powder and 25 parts of 30° Baume sodium silicate having a ratio of silica to sodium oxide of 3.22. The dry flux powder included 95 percent by weight of the flux above set forth, 3 percent of Wyoming bentonite clay, 2 percent of powdered low carbon ferrotitanium (27 to 31 percent by weight of titanium, 20 to 24 percent of silicon and balance substantially iron, with minor amount of aluminum, chromium and carbon).

The hole in the tube was plugged with wax and the slurry, thoroughly homogenized, was applied to the outside of the nozzle except for the clamp end of the tube by dipping to establish a coating thickness of one-sixteenth inch. The coating was dried in still air for four days and then dried at 130° F. for 8 hours and baked at 650° F. for 2 hours, after which it was slowly cooled in the baking oven.

An electroslag weld 14 inches long was made for test purposes using 50 volts constant voltage alternating current at a steady state current of 650 amperes with momentary surges whenever the molten slag made contact with the nozzle. A bare plain carbon steel wire electrode was used of one-eighth inch diameter.

The plates and the weld were than allowed to cool and were sectioned, polished and etched. Good penetration throughout was obtained and the structure of the weld was sound and free from defects.

EXAMPLE 2

Using the procedure of Example 1, with the same size of guide tube and electrode a nozzle was made for welding plates of AISI 1020 steel 5 inches thick. The wing plates of AISI 1020 steel welded to the sides of the guide tube had a thickness of one-half inch and a width of approximately 1¾ inch, the overall width of the nozzle being 4 inches. The groove between the vertical plates was 1½ inches wide. A flux boating was applied as in Example 1 and a test weld was made at 45 volts constant voltage AC with a steady state current of 550 amperes, and surges as the slag contacted the nozzle, and then cooled down, sectioned and etched. The weld was found to be sound, with good penetration throughout and free from visible defects.

The chemical analysis at the center of the weld was satisfactory, and has been determined to be:

Carbon  0.214 percent
Manganese  0.77 percent
Silicon 0.11 percent
Sulfur  0.029 percent
Phosphorus  0.012 percent

EXAMPLE 3

The procedure of Example 1 is carried out employing a flux coating having the following flux ingredients in percentage by weight:

Calcium flouride  2—10 percent
Silica  34—42 percent
Manganous oxide  2—10 percent
Alumina  10—28 percent
Lime  20—32 percent
Magnesia  6—20 percent
Sound welds are obtained.

EXAMPLE 4

The procedure of Example 1 is carried out using in the flux in addition to the bentonite and sodium silicate the following composition in percentage by weight:

Magnesium silicate  20 percent
Ferromanganese (80 percent manganese)  28 percent
Ferrosilicon  15 percent
Silicon manganese  6 percent
Iron metal  31 percent
Sound welds are obtained.

EXAMPLE 5

The procedure of Example 1 was carried out to make successful electroslag welds in 6 inch steel plates using a nozzle of FIGS. 1 to 5, which was 5 inches wide.

In view of my invention and disclosure, variations and modifications to meet individual whim or particular need will doubtless become evident to others skilled in the art to obtain all or part of the benefits of my invention without copying the structure and process shown, and I, therefore, claim all such insofar as they fall within the reasonable spirit and scope of my claims.

I claim:

1. A consumable metallic nozzle for generally vertical electroslag welding having a single longitudinally extending metallic guide tube, metal wing bars extending out from the guide tube at two sides thereof and welded to the guide tube at one edge of each wing bar, and an adhering coating of electroslag flux extending completely around the nozzle cross section over the exposed sides of the guide tube and the exposed sides and edges of the wing bars throughout the length of the nozzle to one end thereof.

2. A nozzle of claim 1, in which the guide tube extends at the one end thereof beyond the wing bars and is free from coating of flux at that location.

3. A nozzle of claim 1, in which the flux includes sodium silicate binder and based on the weight of other ingredients has the following composition by weight:

Calcium flouride   2—10 percent
Silica   34—42 percent
Manganous oxide   2—10 percent
Alumina   10—28 percent
Lime 20—32 percent
Magnesia 6—20 percent 4. A nozzle of claim 1, which the wing bars in cross section are disposed at an angle to one another which on one side is less than 180°.

5. A nozzle of claim 1, in which the horizontal cross section is triangular.

6. A nozzle of claim 1, which varies in cross section along its length.

7. A nozzle of claim 1, which has an axis, the axis curving from end to end of the nozzle.

8. A consumable nozzle for generally vertical electroslag welding, comprising opposed bars extending longitudinally of the nozzle in face-to-face engagement, at least one of said bars having near the middle a groove adjoining the other bar, fastening means holding the bars together, and an adhering coating of electroslag flux extending completely around the nozzle cross section over the exposed sides and edges of the bars throughout the length of the nozzle to one end thereof.

9. A process of making electroslag vertical welds between metallic plates having a plate thickness in excess of 40 mm. and controlling flux additions to the slag, which comprises forming a weld space to be welded between spaced vertical plates each having a thickness in excess of 40 mm., closing the edges of the weld space against leakage, establishing in the weld space a layer of molten metal and on top of it a layer of molten slag, inserting into the weld space a downwardly depending consumable metallic nozzle having a downwardly extending metallic guide tube and metallic wing bars supported thereon in electrical contact with the sides of the guide tube, and having an adhering coating of finely divided electroslag flux and a bond surrounding the outer surface of the guide tube and the wing bars, the bottom of the consumable nozzle engaging the molten slag near the top, and the nozzle being vertically and horizontally stationary in the weld space, inserting a consumable metallic electrode through the guide tube into the molten slag, maintaining a welding voltage between the consumable nozzle, and through the consumable nozzle to the electrode, on the one hand, and the metal plates to be welded on the other hand, so as to distribute electric current to the molten slag through the electrode and also through the consumable nozzle, including the wing bars, progressively melting off the nozzle as the top level of the molten slag rises and progressively melting off flux from the nozzle to add to the molten slag as the top level of the molten slag rises.

10. A process of making electroslag vertical welds between metallic plates having a plate thickness in excess of 40 mm. and controlling flux additions to the slag, which comprises forming a weld space to be welded between spaced vertical plates each having a thickness in excess of 40 mm., closing the edges of the weld space against leakage, establishing in the weld space a layer of molten metal and on top of it a layer of molten slag, inserting into the weld space a downwardly depending consumable metal nozzle having metallic bars in face-to-face engagement secured to one another and provided with a guiding passageway at the middle of at least one bar, and having an adhering coating of finely divided electroslag flux and a bond surrounding the outer surface of the metallic parts of the nozzle, the bottom of the consumable nozzle engaging the molten slag near the top, and the nozzle being vertically and horizontally stationary in the weld space, inserting a consumable metallic electrode through the guide tube into the molten slag, maintaining a welding voltage between the consumable nozzle, and through the consumable nozzle to the electrode, on the one hand, and the metal plates to be welded on the other hand, so as to distribute electric current to to the molten slag through the electrode and also through the consumable nozzle, progressively melting off the nozzle as the top level of the molten slag rises and progressively melting off flux from the nozzle to add to the molten slag as the top level of the molten slag rises.

PO-1050
(5/69)

UNITED STATES PATENT OFFICE
CERTIFICATE OF CORRECTION

Patent No. 3,558,845          Dated January 26, 1971

Inventor(s) James E. Norcross

It is certified that error appears in the above-identified patent and that said Letters Patent are hereby corrected as shown below:

Column 2, line 69, after "nozzle" insert - it will be seen that danger from adjacency of the nozzle - .

Signed and sealed this 20th day of July 1971.

(SEAL)
Attest:

EDWARD M. FLETCHER, JR.
Attesting Officer

WILLIAM E. SCHUYLER, JR
Commissioner of Patents